United States Patent [19]
Hinkle et al.

[11] Patent Number: 5,461,913
[45] Date of Patent: Oct. 31, 1995

[54] DIFFERENTIAL CURRENT THERMAL MASS FLOW TRANSDUCER

[75] Inventors: Luke D. Hinkle, Townsend, Mass.; James Provost, Derry, N.H.

[73] Assignee: MKS Instruments, Inc., Andover, Mass.

[21] Appl. No.: 264,706

[22] Filed: Jun. 23, 1994

[51] Int. Cl.[6] .................................................. G01F 1/68
[52] U.S. Cl. ................................. 73/204.25; 73/204.15
[58] Field of Search .......................... 73/204.15, 204.25, 73/204.27; 324/706, 725; 374/54

[56] References Cited

U.S. PATENT DOCUMENTS

| | | |
|---|---|---|
| 3,851,526 | 12/1974 | Drexel . |
| 4,205,556 | 6/1980 | Runyan .................................. 324/706 |
| 4,464,932 | 8/1984 | Ewing et al. . |
| 4,548,075 | 10/1985 | Mariano . |
| 4,624,138 | 11/1986 | Ono et al. . |
| 4,984,460 | 1/1991 | Isoda .................................... 73/204.15 |
| 5,142,907 | 9/1992 | Hinkle .................................. 73/204.12 |

Primary Examiner—Richard Chilcot
Assistant Examiner—Harshad Patel
Attorney, Agent, or Firm—Lappin & Kusmer

[57] ABSTRACT

The disclosed mass flow transducer is of the type including a balanced bridge comprising two, substantially identical, thermal elements forming two sides of the bridge between the top and the bottom of the bridge, the two elements being adapted to be positioned in two regions of a laminar flow tube in a symmetrical tandem arrangement so as to sense flow through the tube, one element being upstream from the other. The preferred transducer includes control means for monitoring the voltage at the top and bottom of the bridge and monitoring the current required to maintain the node between the thermal elements at virtual ground.

41 Claims, 4 Drawing Sheets

DIFFERENTIAL CURRENT THERMAL MASS FLOW TRANSDUCER

FIELD OF THE INVENTION

The present invention relates generally to mass flow transducers for precisely measuring the mass flow rate of a fluid flowing through a conduit. More particularly, the invention relates to an improved mass flow transducer comprising a bridge circuit including two thermal resistive elements disposed in different regions of the conduit.

BACKGROUND OF THE INVENTION

Flow transducers are typically used to measure the mass flow rate of fluid through a conduit. Various mechanical mass flow transducers, which monitor fluid induced movement of mechanical components, are known in the art and provide rough measurements of the mass flow rate of a fluid. Electrical transducers are known to provide more accurate measurements of fluid flow. Electrical transducers of the thermal type typically rely on one or more temperature-sensitive, resistive elements disposed typically around the conduit. These latter types of transducers are based upon a well known relationship that the rate of heat transfer to a fluid in a laminar flow channel from the walls of the channel is a rather simple function of the temperature difference between the fluid and the walls of the channel, the specific heat of the fluid and the mass flow rate of the fluid within the channel. Since the specific heat of a gas does not vary greatly with pressure or temperature, a thermal mass transducer calibrated for a particular gas will give true mass flow readings over a wide range of operating conditions.

Thermal mass flow transducers therefore include one or more heating elements to transfer heat energy to a fluid stream flowing in a small laminar flow tube, sometimes known as a sensor tube. The heating elements are usually made of a metal alloy having a high resistance and high temperature coefficient of resistance. The sensor tube is usually a thin stainless steel tube, and the elements are wound tightly around the outside of the tube to provide effective heat transfer to the fluid without disturbing the fluid flow within the tube. The high temperature coefficient makes these heating elements also very good devices for sensing the temperature of the tube, and they are often employed in that double capacity. For clarity, such double duty heating/sensing elements will be referred to herein as "thermal elements". These thermal elements are well known and are described, for example, in U.S. Pat. Nos. 4,464,932, entitled THERMAL MASS FLOWMETERING and issued to Ewing; and 4,984,460, entitled MASS FLOWMETER and issued to Isoda.

While a one element fluid flow transducer has been described in U.S. Pat. No. 5,142,907 (Hinkle), thermal fluid flow transducers have tended to develop into two basic varieties, which may be designated the differential voltage variety and the absolute voltage variety. In the differential voltage variety of flow rate transducer, such as disclosed in U.S. Pat. Nos. 3,851,526 (Drexel) and 4,548,075 (Mariano), two identical thermal elements surround a laminar flow tube in a symmetrical tandem arrangement, one element being upstream from the other. The temperature differential between the elements is used as the measure of mass flow. In one traditional arrangement, shown in FIG. 1 and referred to as the two-element, constant current, differential voltage type, a constant current electrical source feeds both elements in a series circuit arrangement.

In FIG. 1 the prior art thermal fluid flow transducer 10 measures the mass flow of a gas flowing through a sensor tube 22 from, for example, a reservoir 24 to a process chamber 26. For small flow rates, the sensor tube 22 is of capillary dimensions and the transducer measures the flow rate directly through the conduit 22. For larger flow rates, both the sensor tube 22 and a by-pass tube 28 couple reservoir 24 to chamber 26, as shown in FIG. 1. Sensor tube 22, and by-pass tube 28 each draw a fixed percentage of the total gas flow. In such a system, the total gas flow between reservoir 24 and process chamber 26 is determined by multiplying the flow measured through sensor tube 22 by a scale factor. Different ranges of mass flows can be sensed by such a device by switching between different sized by-pass tubes 28.

Transducer 10 is shown as the two element, constant current differential voltage type. Specifically, transducer 10 includes a bridge of four resistors, 12, 14, 16 and 18. Resistors 12 and 14 are standard electrical resistors, such as ceramic resistors, and are chosen such that $R_{12}$ (the resistance provided by resistor 12) equals $R_{14}$ (the resistance provided by resistor 14). Resistors 16 and 18 are thermal elements in the form of coils that have an electrical resistance as a function of their temperature, preferably the resistance of each coil increasing as a function of temperature. Resistors 16 and 18 are chosen such that their temperature coefficients are equal, i.e., at any given temperature $R_{16}$ (the resistance of coil 16) equals $R_{18}$ (the resistance of coil 18). Further, the resistors $R_{12}$ and $R_{14}$ need to match the resistors $R_{16}$ and $R_{18}$, both in resistance (at zero flow) and in their temperature coefficients, in order to provide a reliable circuit. An example of this type of transducer circuit is shown and described in the Isoda patent.

The thermal elements, resistors 16 and 18, are typically wrapped around the sensor tube 22 and heated to the same initial temperature above the ambient temperature forcing the same current through each resistor. For this purpose a constant current source 20 provides current to the bridge, and specifically to the resistors 16 and 18. When gas from reservoir 24, which is usually at ambient temperature, flows through sensor tube 22 (as shown in FIG. 1), the flowing gas has a cooling effect on coils 16, 18 and lowers their temperature as a function of mass flow. The flowing gas cools coil 16 more than coil 18 because coil 16 is disposed upstream from coil 18. Transducer 10 measures the mass flow rate of gas flowing through tube 22 by measuring the difference in temperatures between coils 16 and 18, i.e., by measuring the difference in resistances between the two. Thus, when no gas is flowing through tube 22, coils 16 and 18 are at the same temperature and therefore, $R_{16}$ equals $R_{18}$. Since $R_{12}$ equals $R_{14}$, the voltage at node 32 equals the voltage at node 34. When gas flows through tube 22, $R_{16}$ drops below $R_{18}$ due to the differential cooling effect. Therefore, the voltage at node 32 drops below the voltage at node 34. Operational amplifier 36 generates a signal indicative of the difference between the voltages at nodes 32 and 34. This signal is fed to mass flow controller 30 which determines the mass flow rate through conduit 28 and compares it to a set point (the desired flow rate). Controller 30 in turn controls valve 32 to selectively adjust the gas flow rate if the rate sensed by the transducer 10 is not equal to the set point.

The transducer shown in FIG. 1 has several disadvantages. First, the difference between the voltages at nodes 32 and 34 is typically very small, even when gas is flowing at a maximum rate. Measuring this small voltage difference is difficult and the measurement is very susceptible to noise.

Further, since the voltage difference is very small, the difference can not be measured remotely as is often desirable. Rather, the voltage difference must be measured by equipment that is in close proximity to the bridge. Secondly, the output of this device is non-linear. Typically, linearization circuitry is required to calibrate such a device.

Another type of differential (voltage) sensing variety of flow rate transducer is described in U.S. Pat. No. 4,624,138 (Ono, et al.), which can be referred to as the two-element, constant temperature, differential type. This transducer uses a heat producing resistor, which is heated to a constant temperature, and two thermal elements in the form of temperature-sensitive resistors. The heat producing resistor is disposed in a region of the conduit, and the two temperature sensitive resistors are disposed so that one is upstream and the other is downstream from the heat producing resistor. When gas flows through the conduit, the gas conducts heat from the heat producing resistor to the down stream temperature sensitive resistor. By measuring the differential voltages across the temperature-sensitive resistors, this device calculates the mass of gas flowing through the conduit.

This transducer has several disadvantages. Since this device relies on a constant temperature process (because the heat producing resistor is heated to a constant temperature) the device is only useful in a limited range of environmental temperatures. This device has further disadvantages when it is used in connection with a by-pass conduit such as shown at 28 in FIG. 1 because such by-pass instruments can produce undersirable effects when used with constant temperature sensors. When mass flow transducers are used in combination with a sensor tube and a by-pass conduit, it is generally assumed that the mass of gas flowing in the sensor tube is a fixed percentage of the total gas flow. This assumption is only correct if the temperature of the gas in the by-pass conduit is fixed relative to the temperature of gas in the sensor tube. This is true because the viscosity of a fluid depends upon its temperature. So if the temperature of the by-pass conduit varies with respect to the temperature of the sensor tube, the mass of gas flowing in the sensor tube will not be a fixed percentage of the total gas flow. Since the Ono et al. transducer heats the gas in the sensor tube to a constant temperature and the gas in the by-pass conduit can fluctuate with the ambient temperature, this transducer requires temperature compensation equipment if it is to be used in conjunction with a by-pass conduit.

A third type of differential (voltage) sensing variety of transducer can be described as the two-element, floating temperature, differential voltage transducer. Such a transducer is described in U.S. Pat. No. 4,984,460 (Isoda). This device requires four temperature-sensitive resistive elements. Two are disposed around the conduit and two are disposed in the ambient air. The device requires the temperature-sensitive resistors that are disposed in the air to have the same values of resistance and the same temperature characteristics (i.e., the same temperature coefficient of resistance) as the temperature-sensitive resistors that are disposed around the conduit. Requiring four temperature-sensitive resistors rather than two, and requiring that their resistances and temperature coefficients of resistances be matched, makes the implementation of the circuit much more difficult, adding significantly to the cost of the device.

U.S. Pat. No. 4,464,932, entitled THERMAL MASS FLOWMETERING, issued to Ewing et al. describes an example of the absolute voltage type of transducer, in which three thermal elements are used. This transducer can be described as the three element, constant temperature, absolute voltage transducer. It suffers from the same disadvantages as described in connection with the two element, constant temperature, differential voltage type transducer, and in addition the zero point is less stable since the measurement is absolute rather than differential.

OBJECTS OF THE INVENTION

It is an object of the present invention to substantially reduce or overcome the above-identified problems of the prior art.

Another object of the present invention is to provide an improved mass flow transducer.

And another object of the present invention is to provide an improved mass flow transducer that is believed to be more accurate than provided by the prior an systems.

Yet another object of the invention is to provide an improved mass flow transducer that operates in a more linear fashion than prior art traditional two element, constant current, differential voltage type of mass flow transducer.

Still another object of the present invention is to provide an improved mass flow transducer in which the output signal can be reliably measured remotely from the transducer.

And another object of the present invention is to provide an improved mass flow transducer that can be used reliably in conjunction with a sensor tube and a by-pass conduit for measuring the mass flow through the by-pass conduit.

And yet another object of the invention is to provide an improved mass flow transducer that operates reliably over a wide dynamic range.

And still another object of the present invention is to provide an improved mass flow transducer including temperature sensing elements capable of operating at a temperature that floats at a specified value above the environment so as to increase the environmental temperature range and reduce the effects of differences between the sensor channel and by-pass channel.

And yet another object of the present invention is to provide an improved mass flow transducer that generates a differential measurement so as to provide a stable zero indication.

And still another object of the present invention is to provide an improved mass flow transducer that generates a current at ground representative of mass flow making the current less susceptible to noise.

And yet another object of the present invention is to provide an improved mass flow control system comprising the improved mass flow transducer of the present invention.

SUMMARY OF THE INVENTION

These and other objects are provided by an improved mass flow transducer of the type including a balanced bridge comprising two, substantially identical, thermal elements forming two sides of the bridge between the top and the bottom of the bridge, the two elements being adapted to be positioned in two regions of a laminar flow tube in a symmetrical tandem arrangement so as to sense flow through the tube, one element being upstream from the other. The preferred transducer includes control means for monitoring the voltage at the top and bottom of the bridge and monitoring the current required to maintain the node between the thermal elements at virtual ground.

In one aspect the control means includes a voltage divider of two substantially identical resistors forming the other two sides of the bridge, an operational amplifier coupled between the resistors and a transistor for adjusting the current flowing through the divider.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not a restrictive or limiting sense, with the scope of the application being indicated in the claims.

BRIEF DESCRIPTION OF THE DRAWINGS

For a fuller understanding of the nature and objects of the present invention, reference should be had to the following detailed description taken in connection with the accompanying drawings in which the same reference numerals are used to indicate the same or similar parts wherein.

DETAILED DESCRIPTION OF THE DRAWINGS

Figure 1:
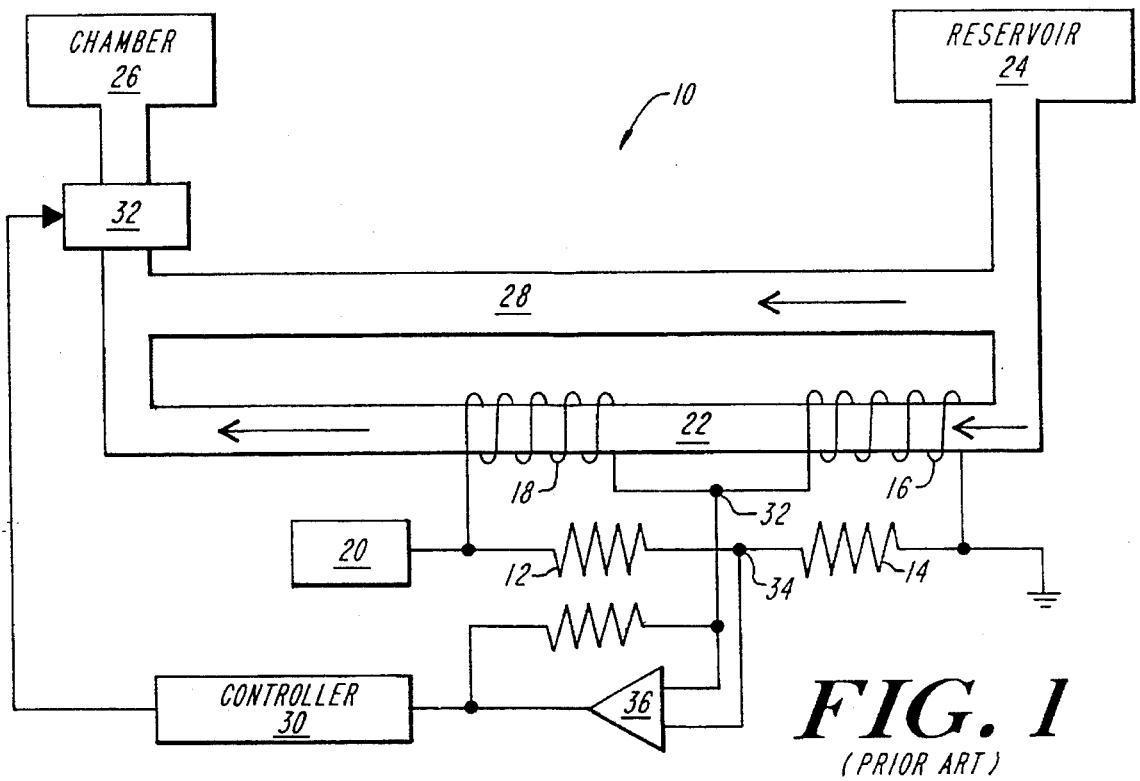
FIG. 1 shows a partial schematic and partial block diagram of a prior art mass flow transducer shown in use with a mass flow controller system for sensing flow through a by-pass tube by sensing the flow through a sensor tube.

In the drawings the same numerals are used to refer to the same or like parts.

Figure 2:
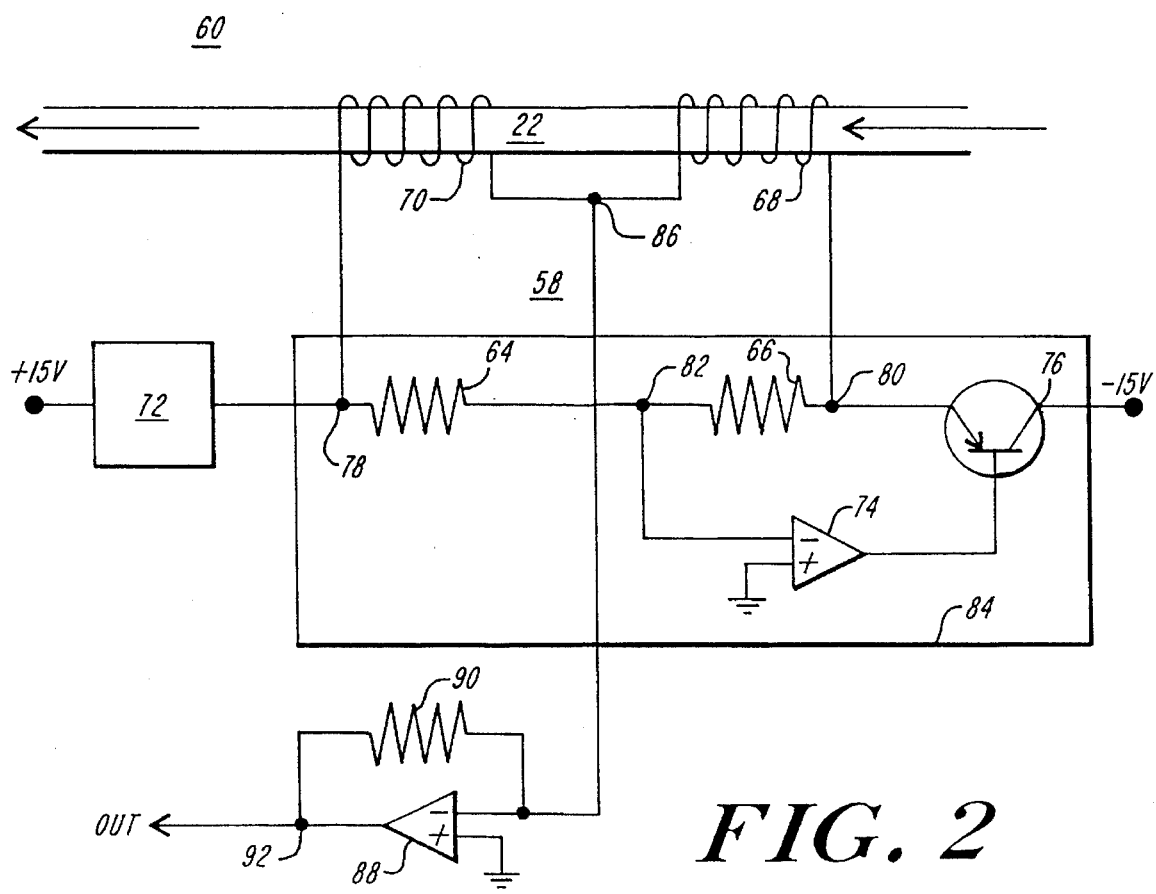
FIG. 2 is a partial schematic and partial block diagram of a preferred embodiment of the mass flow transducer of the present invention.

In FIG. 2 the preferred transducer 60 measures the mass flow rate of gas flowing in sensor tube 22. Transducer 60 includes a balanced bridge 58 of four resistive elements, 64, 66, 68 and 70. Resistors 64 and 66 are standard resistors and are chosen so that they are substantially matched, i.e., such that $R_{64}$ (the resistance of resistor 64) and $R_{66}$ (the resistance of resistor 66) are equal and each has substantially the same thermal coefficient. Resistors 68 and 70 are preferably thermal elements and are chosen so that they are matched, i.e., have the same coefficient of temperature so that for any given temperature, $R_{68}$ (the resistance of thermal element 68) equals $R_{70}$ (the resistance of thermal element 70). The thermal elements 68 and 70, however, do not necessarily have to match the resistive elements 64 and 66. The node 82 of the bridge between resistive elements 64 and 66 is connected to the inverting input of an operational amplifier 74, the latter having its non-inverting input connected to system ground. The output of amplifier 74 is in turn connected to the base of pnp transistor 76. The emitter of transistor 76 is connected to node 80 of the bridge (connecting the resistive element 66 to the thermal element 68), while the collector of the transistor 76 is connected to a negative voltage source, e.g., −15 volts DC. The node 78 connecting the resistive element 64 to the thermal element 70 is connected to a constant current source 72, the latter being powered by a positive voltage source, e.g., +15 volts DC. Finally, the node 86 is connected to the inverting input of operational amplifier 88, the latter having its non-inverting input connected to system ground and its output connected through feedback resistor 90 to node 86. The output of amplifier 88 forms an output terminal 92 of the transducer 60.

The constant current source 72 provides a current through resistive elements 68 and 70, and through resistors 64 and 66. Resistive elements 64 and 66, amplifier 74, and transistor 76 form a control system 84 that operates to maintain the voltages at nodes 78 and 80 equal and opposite to one another so that the voltage at node 82 remains at virtual ground.

The transducer 60 operates in the following manner. With respect to the control system 84, if the negative voltage at node 80, $V_{80}$, decreases in magnitude such that the voltage at node 78, $V_{78}$, becomes greater in magnitude than the negative voltage $V_{80}$, or $V_{78}$ increases in magnitude relative to $V_{80}$ (i.e., $|V_{78}|<|V_{80}|$), then the voltage at node 82, $V_{82}$, will tend to drift above ground. When the voltage $V_{82}$ drifts above ground, the amplifier 74 provides a signal to the base of transistor 76 so that the latter becomes more conductive and thus draws more current so as to pull $V_{80}$ down forcing the voltage at node 82, $V_{82}$, to virtual ground. If $V_{80}$ increases in magnitude such that the voltage $V_{78}$ becomes smaller in magnitude than the negative voltage $V_{80}$, or $V_{78}$ decreases in magnitude relative to $V_{78}$ (i.e., $|V_{78}|<|V_{80}|$), then $V_{82}$ will tend to drift below ground. When $V_{82}$ tends to drift below ground, difference amplifier 74 adjusts transistor 76 to draw less current thereby raising $V_{80}$. When $V_{82}$ is at exactly ground, difference amplifier 74 controls transistor 76 to continue drawing the same amount of current thereby maintaining $V_{82}$ at the current level.

When no fluid is flowing through sensor tube 22, $T_{68}$ (the temperature of thermal element 68) equals $T_{70}$ (the temperature of thermal element 70), and therefore, $R_{68}$ equals $R_{70}$. Since the magnitude of $V_{78}$ is maintained to equal to the magnitude of $V_{80}$, the voltage across elements 68 and 70 will remain equal and opposite to one another, with the node 86 ($V_{86}$) remaining at virtual ground.

Fluid flowing through tube 22 cools thermal element 68 more than thermal element 70 because element 68 is upstream of element 70. Therefore, fluid flowing through tube 22 lowers $R_{68}$ below $R_{70}$ so as to cause the voltage at node 86, $V_{86}$, to tend to drift below ground. As $V_{86}$ tends to drift below ground, differential amplifier 88 supplies current to node 86 through feedback resistor 90 in order to maintain node 86 at virtual ground. The amount of current required to maintain $V_{86}$ at ground 8 is representative of the mass flow of fluid flowing through tube 22. This current can be measured by measuring the voltage across $R_{90}$, or by directly measuring the current at the non-inverting input of amplifier 88. Since this signal is a current at ground level, it can be reliably measured remotely from the transducer 60 components. Further, current through the bridge is supplied by constant current source 72 so that the initial steady state temperatures (the temperatures at zero flow after warm up), $T_{68}$ and $T_{70}$ essentially remain fixed above ambient temperature, but are allowed to float with ambient temperature. Transducer 60, therefore, overcomes the limitations of the two- and three-element constant temperature devices.

Figure 3:
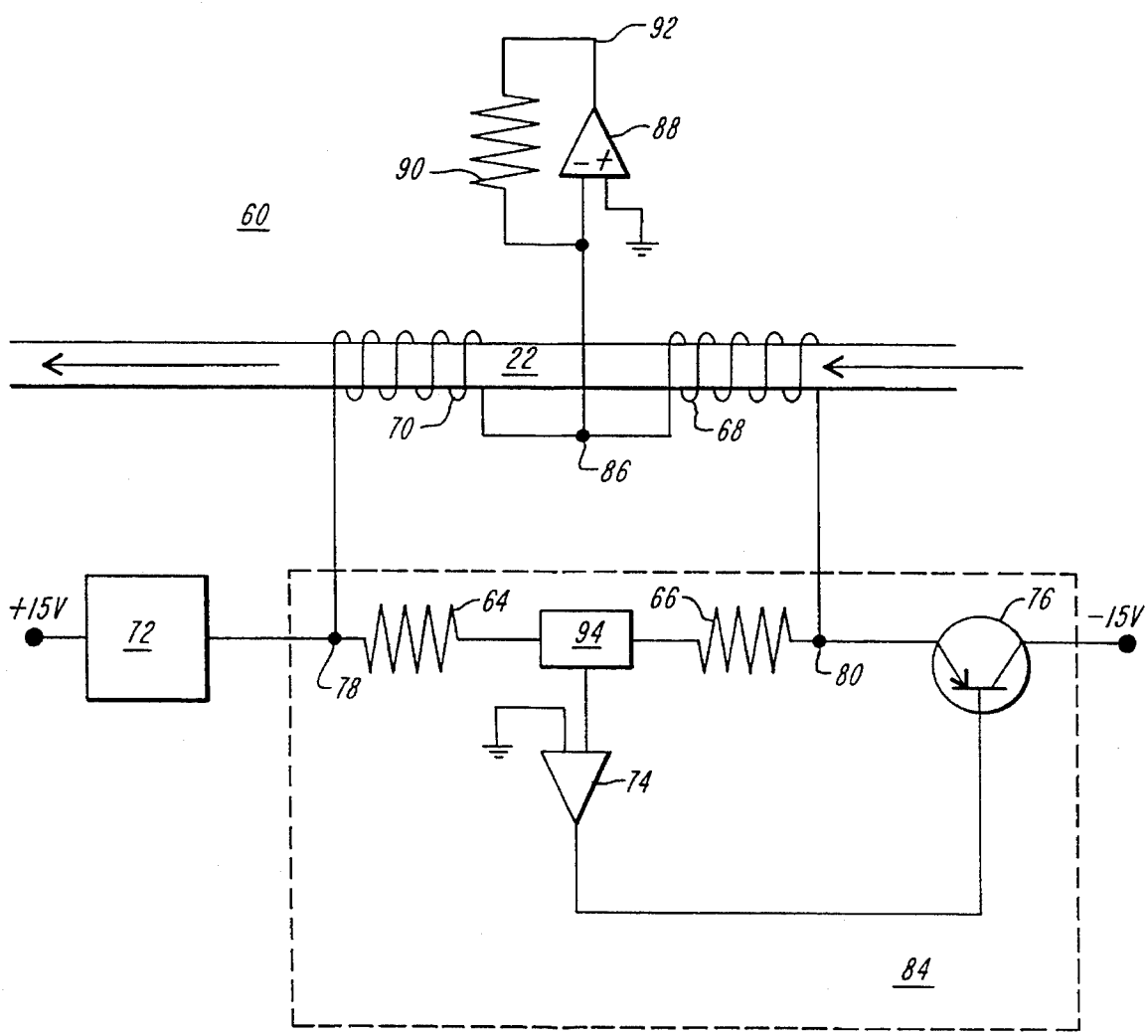
FIG. 3 is a partial schematic and partial block diagram of another preferred embodiment of the invention.

FIG. 3 shows one modification to the embodiment of FIG. 2. In this embodiment, control system 84 includes a potentiometer 94 disposed between resistors 64 and 66 for compensating for any mismatches between the two resistors. Potentiometer 94 thus facilitates balancing the voltages at nodes 78 and 80.

Figure 4:
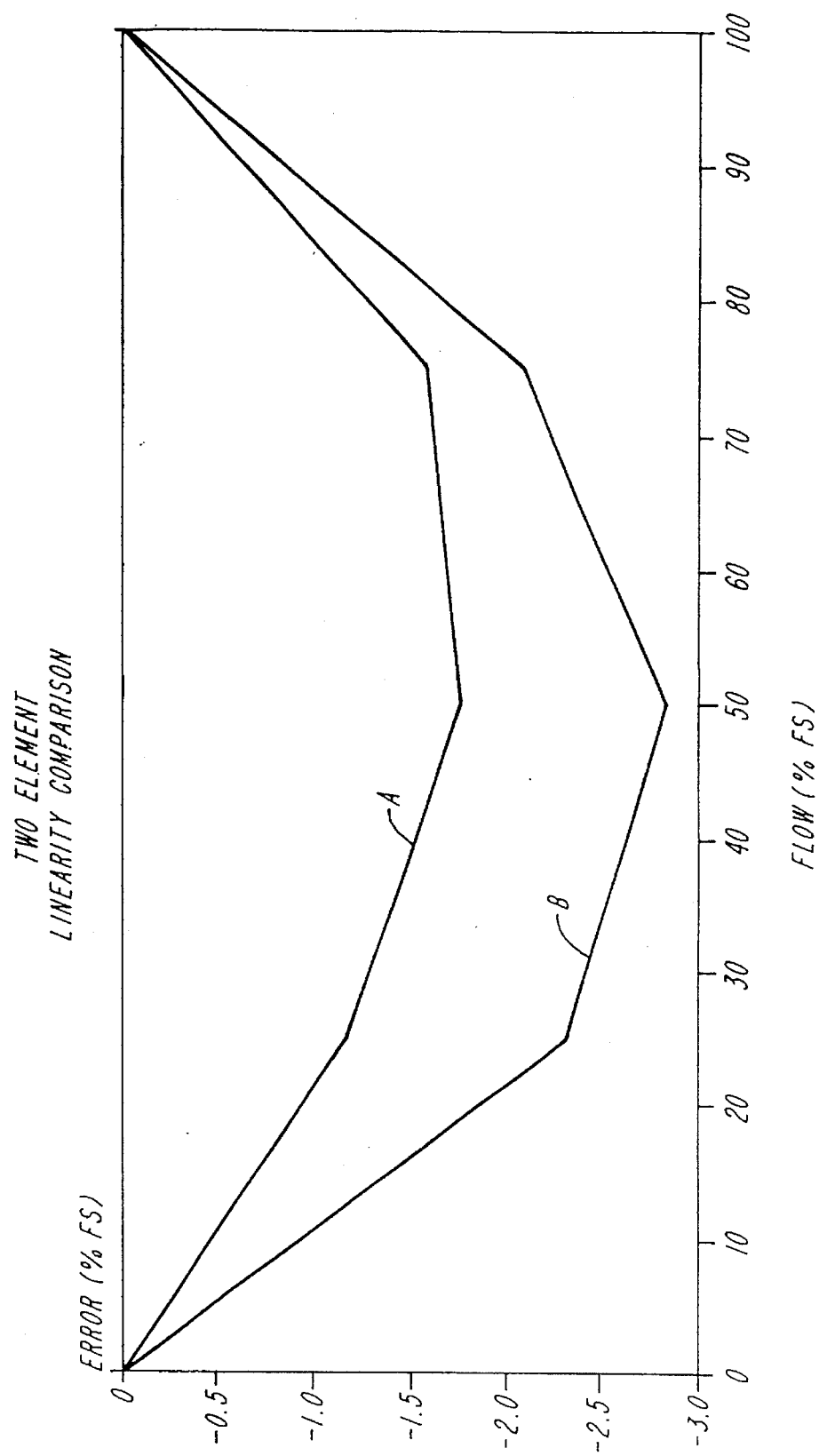
FIG. 4 is a graph comparing the errors of a transducer constructed according to the principles of the present invention and a prior art transducer of the type shown in FIG. 1.

FIG. 4 shows a comparison of the errors in the outputs of a transducer constructed according to the invention (CURVE A) and the prior art transducer (CURVE B) illustrated in FIG. 1. FIG. 4 shows the relationship of error (as a percentage of full scale) and the flow rate (as a percentage of full scale). As FIG. 4 shows, the transducer 60 constructed in accordance with the present invention provides reduced error and an output response that is more linear than the prior art transducer of the type shown in FIG. 1.

The invention has been discussed in connection with balancing voltages $V_{78}$ and $V_{80}$ such that $V_{78}$ equals $-V_{80}$. As those skilled in the art will appreciate, rather than tying the bridge circuit between +15 Volt and −15 Volt rails, the circuit could be tied between, for example, +10 Volt and ground rails. In this case, the sensor would maintain $V_{82}$ and $V_{76}$ at a system reference level of +5 Volts rather than at virtual ground. The sensor would still operate in the same fashion, and $V_{78}$ and $V_{80}$ would still be balanced at an identical amount above and below, respectively, the system reference level.

Figure 5:
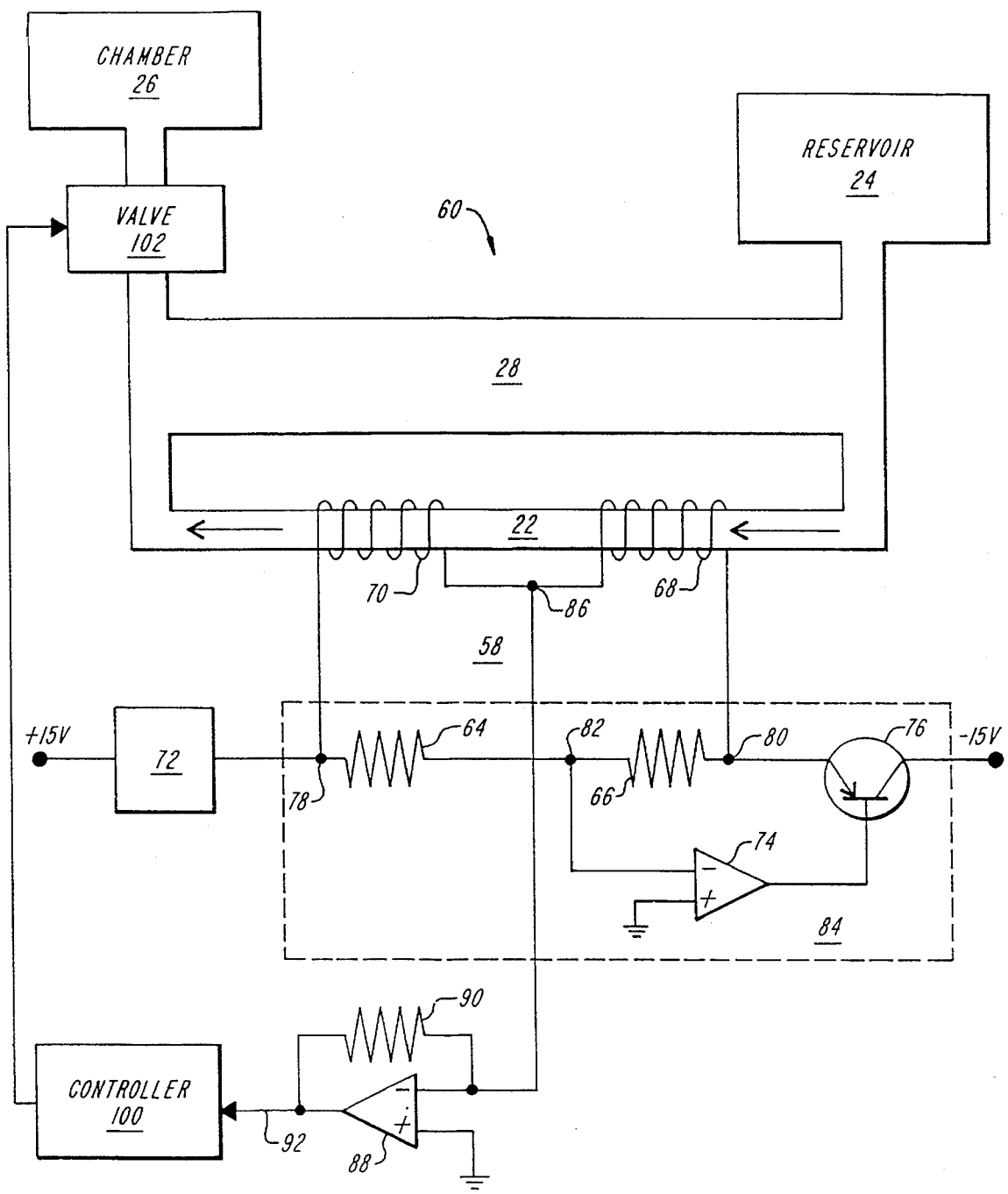
FIG. 5 is a partial schematic and partial block diagram of a preferred embodiment of the mass flow transducer of the present invention shown in use with a mass flow controller system for sensing flow through a by-pass tube by sensing flow through a sensor tube.

The transducer 60 is particularly useful when used in combination with other components so as to control the mass flow rate through the tube 22. For example, as shown in FIG. 5, the output of the transducer 60 is shown connected to the input of a mass flow controller 100. The output of the controller 100 is used for controlling a proportional control valve 102, the latter for controlling the rate of flow of gas from reservoir 24 to chamber 26. Controller 100 can be coupled to the output of amplifier 88, as shown in FIG. 5, in which case controller 100 measures the voltage across resistor 90 as the output signal; or controller 100 can be coupled to the input of amplifier 88 in which case controller 100 measures the current at ground as the output signal. As is well known, the proportional control valve can be connected upstream of transducer 60, or as shown, downstream of the transducer.

The transducer 60 thus provides an improved mass flow transducer for sensing the mass flow rate of a fluid through a channel. Mass flow transducer 60 is believed to be more accurate because it operates in a more linear fashion than prior art traditional two element, constant current, differential voltage type of mass flow transducer, such as the type shown in FIG. 1. Because the output signal at the input of amplifier 88 is a current relative to ground level, the output can be reliably measured remotely from the transducer, provide a stable zero indication, and be less susceptible to noise. The mass flow transducer 60 can be used reliably in conjunction with a sensor tube and a by-pass tube for measuring the total mass flow through both tubes as shown in FIG. 5. The device operates reliably over a wide dynamic range with thermal elements operating at a temperature that floats at a specified value above the environment so as to increase the environmental temperature range and reduce the effects of irregularities between the sensor channel and by-pass channel. Finally, an improved mass flow control system comprising the mass flow transducer 60 can provide more accurate control.

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. A circuit for sensing a difference between the temperature at a first location and the temperature at a second location, said circuit comprising:
    A) a bridge including
        (i) first, second, third and fourth nodes;
        (ii) means for defining a first resistance between the first and second nodes;
        (iii) means for defining a second resistance between the second and third nodes;
        (iv) first temperature sensing means, disposed at said first location, for defining a third resistance between the first and fourth nodes, having a resistance value as a function of the temperature at said first location; and
        (v) second temperature sensing means, disposed at said second location, for defining a fourth resistance between the fourth and third nodes, having a resistance value as a function of the temperature at said second location;
    B) first control means for controlling a voltage across said first and second resistances so that a voltage at said second node is maintained at a predetermined reference level; and
    C) second control means for maintaining a voltage at said fourth node at said predetermined reference level and for generating an output signal as a function of the difference between the resistance values of said third resistance and of said forth resistance and representative of the difference in temperatures between said first and second locations.

2. A circuit according to claim 1, wherein said predetermined reference level is virtual ground.

3. A circuit according to claim 2, wherein said first and second resistances are substantially identical, and said first control means includes means for applying a current through said first and second resistances so as to provide substantially equal voltages across said first and second resistances.

4. A circuit according to claim 3, wherein said first and second temperature sensing means each includes resistive means having substantially identical temperature coefficients.

5. A circuit according to claim 1, wherein said first control means includes an amplifier for generating a compensation signal as a function of any sensed difference between the voltage at said second node and a system reference level, and means, responsive to said compensation signal, for adjusting the current flow through said second resistance so as to maintain said voltage at said second node at said predetermined reference level.

6. A circuit according to claim 5, wherein said means for adjusting the current flow through said second resistance includes transistor means connected to said third node and having its base connected to receive said compensation signal.

7. A circuit according to claim 5, wherein said system reference level is ground.

8. A circuit according to claim 1, wherein said second control means includes an operational amplifier for generating said output signal.

9. A circuit according to claim 8, wherein said operational amplifier includes an input connected to said fourth node, a second input connected to a system reference level, and feedback means for providing a compensation signal to said fourth node as a function of said output signal so as to maintain said fourth node at said predetermined reference level.

10. A circuit according to claim 9, wherein said predetermined reference level is virtual ground.

11. A circuit according to claim 9, wherein said system reference level is ground.

12. A circuit according to claim 1, wherein said first and second control means includes a constant current source for providing current through said first, second, third and fourth resistances.

13. A circuit according to claim 1, wherein said temperature sensing means each include a thermal element.

14. A mass flow control system including (a) a control valve for controlling the rate of fluid flow through a conduit, (b) a transducer for sensing the rate of fluid flow through said conduit as a function of the difference in temperature between first and second regions of said conduit and for generating a control signal as a function or said rate of fluid flow, and (c) a mass flow controller for controlling the operation of said valve as a function of said control signal; said transducer comprising:
  A) a bridge including
    (i) first, second, third and fourth nodes;
    (ii) means for defining a fast resistance between the first and second nodes;
    (iii) means for defining a second resistance between the second and third nodes;
    (iv) first thermal element means, disposed in said first region, for defining a third resistance between the first and fourth nodes, having a resistance value as a function of the temperature in said first region; and
    (v) second thermal element means, disposed in said second region, for defining a fourth resistance between the fourth and third nodes, having a resistance value as a function of the temperature in said second region;
  B) first control means for controlling a voltage across said first and second resistances so that a voltage at said second node is maintained at a predetermined reference level; and
  C) second control means for maintaining a voltage at said fourth node at said predetermined reference level and for generating an output signal as a function of the difference between the resistance values of said third resistance and of said forth resistance and representative of the rate of flow of fluid through said conduit.

15. A control system according to claim 14, wherein said predetermined reference level is virtual ground.

16. A control system according to claim 15, wherein said first and second resistances are substantially identical, and said first control means includes means for applying a current through said first and second resistances so as to provide substantially equal voltages across said first and second resistances.

17. A control system according to claim 16, wherein said first and second thermal element means have substantially identical temperature coefficients.

18. A control system according to claim 14, wherein said first control means includes an amplifier for generating a compensation signal as a function of any sensed difference between said voltage at said second node and a system reference level, and means, responsive to said compensation signal, for adjusting the current flow through said second resistance so as to maintain said voltage at said second node at said predetermined reference level.

19. A control system according to claim 18, wherein said means for adjusting the current flow through said second resistance includes transistor means connected to said third node and having its base connected to receive said compensation signal.

20. A control system according to claim 18, wherein said system reference level is ground.

21. A control system according to claim 14, wherein said second control means includes an operational amplifier for generating said output signal.

22. A control system according to claim 21, wherein said operational amplifier includes an input connected to said fourth node, a second input connected to a system reference level, and feedback means for providing a compensation signal to said fourth node as a function of said output signal so as to maintain said fourth node at said predetermined reference level.

23. A control system according to claim 22, wherein said predetermined reference level is virtual ground.

24. A control system according to claim 22, wherein said system reference level is ground.

25. A control system according to claim 14 wherein said first and second control means includes a constant current source for providing current through said first, second, third and fourth resistances.

26. An improved mass flow transducer of the type including a balanced bridge comprising a first node and a second node and two, substantially identical, thermal elements forming two sides of the bridge between the first and second nodes of the bridge, the two elements being adapted to be positioned in two regions of a laminar flow tube in a symmetrical tandem arrangement so as to sense flow through the tube, one element being upstream from the other; wherein the improvement comprises:
  first control means for monitoring a voltage level as a function of the voltages at the first and second nodes of the bridge and for maintaining said voltage level at a predetermined reference level; and
  second control means for monitoring the current required to maintain a voltage at a third node between the thermal elements at said predetermined reference level.

27. A transducer according to claim 26, wherein said first control means includes means for maintaining the voltages at the first and second nodes at respective levels which are equal in magnitude and opposite in polarity to each other.

28. A transducer according to claim 27, wherein said second control means includes an operational amplifier having two inputs, one of said inputs coupled to said third node and the other of said inputs coupled to a system reference level, and a feedback resistor connected between the output of the amplifier and said one input.

29. A transducer according to claim 28, wherein said system reference level is ground.

30. A transducer according to claim 26, wherein said balanced bridge includes two resistive elements connected between the first and second nodes and to each other at a fourth node, said transducer further comprising a constant current source for providing constant current through said resistive elements and said thermal elements.

31. A transducer according to claim 30, wherein said first control means includes switching means for controlling current between said forth node and said second node and an amplifier having an input coupled to said fourth node and a second input connected to a system reference level and its output for controlling said switching means.

32. A transducer according to claim 31, wherein said system reference level is ground.

33. A transducer according to claim 26, wherein said predetermined reference level is ground.

34. A mass flow control system including (a) a control valve for controlling the rate of fluid flow through a conduit, (b) a transducer for sensing the rate of fluid flow through said conduit as a function of the difference in temperature between first and second regions of said conduit and for generating a control signal as a function of said rate of fluid flow, said transducer being of the type including a balanced bridge comprising two, substantially identical, thermal elements forming two sides of the bridge between a a first node and a second node of the bridge, the two elements being adapted to be positioned in two regions of a laminar flow tube in a symmetrical tandem arrangement so as to sense flow through the tube, one element being upstream from the other; and (c) a mass flow controller for controlling the operation of said valve as a function of said control signal; the transducer further comprising:

first control means for monitoring a voltage level as a function of the voltages at the first and second nodes of the bridge and for maintaining said voltage level at a predetermined reference level; and second control means for monitoring the current required to maintain a voltage at a third node between the thermal elements at said predetermined reference level.

35. A control system according to claim 34, wherein said first control means includes means for maintaining the voltages at the first and second nodes of the bridge at respective levels which are equal in magnitude and opposite in polarity to each other.

36. A control system according to claim 35, wherein said second control means includes an operational amplifier having two inputs, one of said inputs coupled to said third node and the other of said inputs coupled to a system reference level, and a feedback resistor connected between the output of the amplifier and said one input.

37. A control system according to claim 36, wherein said system reference level is ground.

38. A control system according to claim 34, wherein said balanced bridge includes two resistive elements connected between the first and second nodes of said bridge and to each other at a fourth node, said transducer further comprising a constant current source for providing constant current through said resistive elements and said thermal elements.

39. A control system according to claim 38, wherein said first control means includes switching means for controlling current between said forth node and said second node and an amplifier having an input coupled to said fourth node and a second input connected to a system reference level and its output for controlling said switching means.

40. A control system according to claim 39, wherein said system reference level is ground.

41. A control system according to claim 34, wherein said predetermined reference level is ground.

\* \* \* \* \*

UNITED STATES PATENT AND TRADEMARK OFFICE
CERTIFICATE OF CORRECTION

PATENT NO. : 5,461,913
DATED : October 31, 1995
INVENTOR(S) : Luke D. Hinkle and James Provost It is certified that error appears in the above-indentified patent and that said Letters Patent is hereby corrected as shown below:

Claim 1, column 8, line 31, delete "forth" and substitute therefor -- fourth --;

Claim 14, column 9, line 24, delete "fast" and substitute therefor -- first --;

Claim 39, column 12, line 18, delete "forth" and substitute therefor -- fourth --.

Signed and Sealed this

Nineteenth Day of March, 1996

Attest:

BRUCE LEHMAN

Attesting Officer     Commissioner of Patents and Trademarks